(12) United States Patent
Perissinotto et al.

(10) Patent No.: US 8,727,922 B2
(45) Date of Patent: May 20, 2014

(54) TENSIONING APPARATUS WITH LOCKING BRACKET

(75) Inventors: Renzo Perissinotto, Dachau (DE); Tobias Schmid, Bronnen (DE); Christian Bauer, München (DE)

(73) Assignee: IWIS Motorsysteme GmbH & Co. KG, Munich (DE)

( * ) Notice: Subject to any disclaimer, the term of this patent is extended or adjusted under 35 U.S.C. 154(b) by 146 days.

(21) Appl. No.: 13/158,103

(22) Filed: Jun. 10, 2011

(65) Prior Publication Data
US 2012/0040790 A1    Feb. 16, 2012

(30) Foreign Application Priority Data
Jun. 11, 2010    (EP) .................................... 10006086

(51) Int. Cl.
*F16H 7/22* (2006.01)
*F16H 7/08* (2006.01)

(52) U.S. Cl.
USPC .......................................................... 474/110

(58) Field of Classification Search
USPC .......................................................... 474/110
See application file for complete search history.

(56) References Cited

U.S. PATENT DOCUMENTS

| | | | | |
|---|---|---|---|---|
| 4,792,322 A * | 12/1988 | Goppelt et al. | ............... | 474/136 |
| 5,931,754 A * | 8/1999 | Stief et al. | ...................... | 474/109 |
| 5,989,139 A * | 11/1999 | Dusinberre et al. | ........... | 474/110 |
| 6,120,402 A * | 9/2000 | Preston et al. | ................. | 474/109 |
| 6,126,563 A * | 10/2000 | Simpson | ........................ | 474/110 |
| 6,244,981 B1 * | 6/2001 | Simpson | ........................ | 474/110 |
| 6,435,992 B2 * | 8/2002 | Wakabayashi et al. | ....... | 474/101 |
| 6,817,958 B2 * | 11/2004 | Kaido et al. | ................... | 474/101 |
| 6,916,264 B2 * | 7/2005 | Hashimoto et al. | ........... | 474/109 |
| 6,935,978 B2 * | 8/2005 | Hayakawa et al. | ........... | 474/109 |
| 7,189,174 B2 * | 3/2007 | Yamamoto et al. | ........... | 474/109 |
| 7,455,607 B2 * | 11/2008 | Narita et al. | ................... | 474/109 |

(Continued)

FOREIGN PATENT DOCUMENTS

| | | |
|---|---|---|
| DE | 10014700 A1 | 10/2001 |
| DE | 19680418 C1 | 11/2001 |

(Continued)

OTHER PUBLICATIONS

European Search Report; European Patent Application No. 10 006 086.2; mailed Jan. 21, 2011.

*Primary Examiner* — William A Rivera
*Assistant Examiner* — Henry Liu
(74) *Attorney, Agent, or Firm* — Baker & Hostetler LLP

(57) ABSTRACT

A tensioning apparatus or device for a flexible driving means, particularly a drive chain for an internal combustion engine, comprises a housing, a tensioning piston movably guided in said housing and an adjusting or regulating means for gradually adjusting the working stroke of the tensioning piston. The adjusting means comprises a locking bracket and an appertaining locking profile at the tensioning piston, two arch-shaped clamping sections of said locking bracket being engageable with said locking profile, and a resilient spring portion with a torsional area combining the clamping sections in spring-resilient manner. In a preferred embodiment, the locking bracket comprises a U-shaped section with a portion angled towards the housing wall and forming the torsional area. The housing is further provided with a guide projection projecting from said housing wall for axially guiding said angled portion of said U-shaped section of said locking bracket in the working stroke of said tensioning piston in torsion-proof manner.

14 Claims, 8 Drawing Sheets

(56) References Cited

U.S. PATENT DOCUMENTS

| | | | |
|---|---|---|---|
| 7,527,572 B2* | 5/2009 | Sato et al. | 474/109 |
| 7,559,863 B2* | 7/2009 | Onimaru et al. | 474/110 |
| 7,571,632 B2* | 8/2009 | Yamamoto et al. | 72/370.21 |
| 7,677,999 B2* | 3/2010 | Sato et al. | 474/109 |
| 7,775,921 B2* | 8/2010 | Izutsu et al. | 474/110 |
| 8,257,212 B2* | 9/2012 | Yoshimura et al. | 474/110 |
| 2003/0139235 A1* | 7/2003 | Yamamoto et al. | 474/109 |
| 2004/0092348 A1* | 5/2004 | Hashimoto et al. | 474/109 |
| 2004/0266571 A1* | 12/2004 | Izutsu et al. | 474/110 |
| 2006/0094548 A1* | 5/2006 | Sato et al. | 474/109 |
| 2006/0281595 A1* | 12/2006 | Narita et al. | 474/109 |
| 2010/0016105 A1* | 1/2010 | Yoshimura et al. | 474/110 |
| 2010/0222167 A1* | 9/2010 | Chekansky et al. | 474/110 |
| 2011/0183796 A1* | 7/2011 | Kurematsu et al. | 474/110 |

FOREIGN PATENT DOCUMENTS

| | | |
|---|---|---|
| DE | 20 2007 008 985 U1 | 11/2008 |
| EP | 2131066 A2 | 12/2009 |
| WO | 2009/000354 A1 | 12/2008 |

* cited by examiner

TENSIONING APPARATUS WITH LOCKING BRACKET

CROSS-REFERENCE TO RELATED APPLICATION

This application claims priority to foreign European Patent Application EP 10006086.2, filed on Jun. 11, 2010, the disclosure of which is incorporated herein by reference in its entirety.

FIELD OF THE INVENTION

The present invention relates to a tensioning apparatus for a flexible drive means, particularly a drive chain of an internal combustion engine, comprising a housing, a tensioning piston movably guided within said housing, and an adjusting or regulating means for gradually adjusting the working stroke of said tensioning piston, the adjusting means comprising a locking bracket with appertaining locking profile at the tensioning piston, wherein said locking bracket comprises two clamping sections for engagement with said locking profile at the tensioning piston and a spring section for combining said clamping sections with each other.

BACKGROUND

Piston-operated tensioning apparatuses or devices with adjusting means are very popular and are especially used for timing chain drives in internal combustion engines. In this connection, the housing forms, together with a hollow cylindrical tensioning piston, a pressure chamber in the piston bore of the housing, said chamber commonly being filled with a hydraulic means and being provided with a pressure spring to preload the tensioning piston. In many cases, such tensioning devices comprise adjusting means in the form of locking mechanisms defining a blocking and sliding direction for the tensioning piston, thereby preventing the tensioning piston to move into the housing too deeply by means of a stopper, yet allowing the working stroke of the tensioning piston to be adjustable.

Such a tensioning apparatus with conventional locking mechanism is known from DE 100 14 700 A1 in which the tensioning piston includes a saw tooth profile into which a ratchet block engages through a window opening of the housing. In said tensioning apparatus, the free working stroke of the tensioning piston is limited by the axial freedom of motion of the ratchet block in said housing window.

A generic tensioning apparatus or device is known from DE 196 80 418 C1. Here, the tensioning piston of said hydraulic tensioner comprises multiple circumferential axially spaced-apart snap-in grooves. A locking bracket is slipped onto the tensioning piston and initially engages into the uppermost snap-in groove of said tensioning piston by means of a ring-shaped section of the locking bracket. For adjusting or regulating said ring-shaped spring clip the housing is provided with a lower chamfered stop face as well as an upper stop ring embedded in the inner circumference of the housing bore. There is ample operating range therebetween to allow the tensioning device to deploy its damping effect. To form the stoppers, the locking bracket is provided with a U-shaped section and with two end legs radially extending outwards from said ring-shaped clamping section and moving in the working stroke of the tensioning piston in corresponding housing windows between the lower stopper and the upper stop ring. When the working stroke of the tensioning piston is adjusted or regulated, the locking bracket abuts at the upper stop ring, and the tensioning piston advancing further due to wear-stretching of the chain radially widens or spreads-apart the ring-shaped section of the locking bracket and pushes, in case of sufficient advancing movement, said locking bracket into the next locking profile groove. To spread apart or widen the ring-shaped section of the locking bracket, both arch-shaped clamping sections thereof are bent apart in the region of the U-shaped section. In order to ensure a reversible, spring-elastic bending, the diameter of the round wire used for the locking bracket must not exceed a thickness depending on the diameter of the tensioning piston and the widening of the ring-shaped clamping section. If the ring-shaped section of the locking bracket abuts against the lower chamfered stop face during a retraction movement of the tensioning piston, the ring-shaped section of the locking bracket is pressed into the locking groove and the retraction movement of the tensioning piston into the housing is blocked. The clamping effect of the locking bracket for blocking the retraction movement can be improved by larger round wire diameters.

Tensioning apparatuses or devices including adjusting or regulating means for limiting the retraction movement of a tensioning piston and simultaneously defining the free working stroke of said tensioning piston are very popular in technology in a variety of concepts and embodiments and proved successful when in action. Unfortunately, adjusting such tensioning devices generally requires relatively complex structures and definite adaptations to the functions thereof as well as individual manufacture of the required components.

The tensioning devices with adjusting means as known in technology are available in a variety of concepts with the embodiments directed to the corresponding case of application. However, due to the progressive technical development, also those products that have already been well-established in technology underlie the constant pressure to come up with innovations in order to improve existing designs. Considering the increasing cost pressure in combination with huge quantities particularly in the automotive industry, there is a general continuous need for optimization and the attempt to reduce costs by synergy effects.

SUMMARY OF THE INVENTION

The present invention is based on the object to provide a tensioning apparatus for a flexible drive means including an adjusting or regulating means, the structure thereof combined with reliable functioning enabling a cost-effective production owing to a most simple structure and assembly.

According to the invention, the above object is solved in a generic tensioning apparatus for a flexible drive means in that the spring section includes at least one torsional area for connecting the clamping sections in spring-resilient manner.

The inventive development of a tensioning apparatus allows for a reliable, reversible widening of the clamping area of the locking bracket when adjusting the working stroke of the tensioning piston. Contrary to conventional locking brackets according to which widening of the clamping sections of the locking bracket is exclusively done by bending the spring section combining the two clamping sections of said locking bracket, the inventive development of the tensioning apparatus allows for an additional torsion spring pitch in said spring section and thus for a reduced flexural loading thereof. Due to the reduced flexural loading, plastic deformation of said spring section may reliably be prevented, particularly if the spring section of the locking bracket is of U-shaped form. Functional reliability and life time of the tensioning apparatus can thereby be increased. Moreover, reducing the flexural loading in the bending area means that the thickness of the material can be increased, for example a larger round wire cross-section for round wire locking brackets. An increased material thickness or an enlarged cross-section of the locking bracket increases the clamping face of the locking bracket in the locking profile on the tensioning piston, thus improving the clamping function for blocking the retraction movement of the tensioning piston.

For a uniform opening of the clamping area of the locking bracket while adjusting the working stroke of the tensioning piston, the clamping sections can be combined by the spring section in such a spring-resilient manner that the torsional area performs a torsion spring pitch while the clamping sections are laterally moving apart in one plane. In this connection, the torsion spring pitch is the distance covered by the spring section in order to obtain a specific resilient spring action that is due to the torsional area and its elastic force.

In an advantageous embodiment, the spring section may further comprise at least one bending area and the spring section may combine the clamping sections in such a spring-resilient manner that the torsional area performs a torsion spring pitch and the bending area performs a spiral spring pitch while the clamping sections are laterally moving apart in one plane. The spiral spring pitch is the distance covered by the spring section for obtaining a resilient spring action that is due to the bending area and its elastic force. Due to the additional bending area of the spring section, there is a reliable, uniform spring-elastic connection of the clamping sections at a low risk of plastic spring section deformations or of widening the two clamping sections.

In order to provide utmost stiffness of the locking bracket for a reliable clamping of the tensioning piston when blocking the retraction movement, the torsion spring pitch may have a stronger effect on the spring-resilient movement of the clamping sections than the spiral spring pitch while said clamping sections move apart laterally.

To obtain a particularly simple design of the torsional area same might have the form of a torsion bar, the axis of said torsion bar being arranged at an angle to the plane of the lateral movement of said clamping sections, particularly at an angle between 45° and 90°, preferably between 75° and 90°. Apart from the simple form of the torsional area, the inclination of the torsion bar allows for a simple setting of the relationship of torsion spring pitch and spiral spring pitch, the torsion spring pitch portion increasing with increasing angle and reaching its peak value when it is arranged vertically.

In a special development, the spring section comprises at least two torsional areas increasing, due to the assignment to the two clamping sections of the locking bracket, the resilience of said spring section and allowing for a uniform distribution of the torsion to the two clamping sections.

Expediently, the spring section may be designed as a U-shaped section of the locking bracket partially extending outwards and including an angled portion. The angled portion of the U-shaped section allows for a simple structure of the torsional area, wherein the legs formed as torsion bars of said angled portion are connected to the two clamping sections of the locking bracket via that part of the U-shaped section extending radially outwards. Depending on the form and on the stiffness of the U-shaped section extending radially outwards and on the bridge combining both legs of the angled portion, the bending area of the spring section is distributed to these elements. The angled portion of the U-shaped section of the locking bracket substantially extends in parallel or at a small angle to the piston axis outside the housing wall. In order to provide a torsional area for a tensioning apparatus according to the invention it will suffice when the angled portion is arranged at any angle to the part of the U-shaped section extending radially outwards. However, as the flexural elastic characteristics of the U-shaped section displace with increasing angle between the portion extending radially outwards and the angled portion from a flexural loading up to a torsional loading, the inclination of the angled portion is preferably between 75° and 90°, in case of a 90°-angle the torsion spring pitch of the torsional area being largest.

In yet another embodiment of the inventive tensioning apparatus the housing comprises a guiding projection projecting from the wall of the housing and axially guiding the angled portion of the U-shaped section of the locking bracket in the working stroke of the tensioning piston in torsion-proof manner. Thus, the tensioning piston can be guided in its working stroke either axially or radially. The angled portion of the U-shaped section arranged laterally at a constant or varying distance to the outer shell of the housing extends, upon movement of the tensioning piston within the operating range of the tensioning apparatus, at said distance parallel to the outer shell in longitudinal direction of the tensioning piston. The question whether or not the actual distance of the angled portion to the wall of the housing is the same over the angled portion is negligible. Clamping the ring-shaped portion of the locking bracket with the two arch-shaped clamping sections on the appertaining locking profile of the piston thus also allows for guiding the tensioning piston through the locking bracket. Due to this simple structure, there is not only an improved flexural bending and widening of the clamping sections but also a reduction of components by avoiding or integrally forming components and a simple assembly of the tensioning device.

A preferred at least partial arrangement of the guiding projection between the parallel legs of the angled portion of the U-shaped section of the locking bracket does not only provide good axial guidance of the locking bracket and the tensioning piston but also a safe securing against radial torsion with only very small torsion angle allowances. Axial guidance and torsion-proof condition of locking bracket and tensioning piston allow for dimensioning the required window sections in the working stroke of the tensioning piston irrespective of the locking bracket sections extending radially outwards.

According to a preferred embodiment, a stopper is provided at the rear end of the guiding projection, i.e. at the end opposite to the tensioning direction of the piston, for limiting the axial movement of the locking bracket in the advancing direction by abutment of the bridge combining the legs of the angled portion against said stopper. To form a stopper integrally at the rear end of the guiding projection enables, due to synergy effects, to save components, e.g. the stop ring, while manufacturing the housing according to the injection molding technology in still undercut-free manner. Furthermore, the guiding projection can be chamfered at its tension-side end to enable a simple assembly of the locking bracket, e.g. by clipping, while the tensioning apparatus is being assembled. Preferably, the end lying in the tensioning direction of the piston may reach the level of the rest of the housing wall.

For a cost-effective and solid design of the locking bracket same can be made of a round wire. Apart from the relatively cost-effective price for the round wire material, such wire can be easily processed and has good dimensional stability with high strength characteristics. Moreover, the round wire allows for a simple design of the torsional range in form of a torsion bar with uniform torsional characteristics that can be determined definitely. Expediently, the clamping sections of the locking bracket designed corresponding to the form of the tensioning piston and being at least partially in close contact therewith are in the form of two arch-shaped sections opposing each other, each arranged in extension of the parallel legs of the U-shaped portion. Thus, there is a very simple structure of the locking bracket with high functionality.

According to a suitable embodiment, the locking profile at the tensioning piston has been designed as a groove profile including multiple snap-in grooves, preferably circumferential snap-in grooves. As the snap-in grooves are arranged one over the other at the tensioning piston, there is a simple, effective locking profile structure. For a fine adjustment graduation of the working stroke of the tensioning piston, the distance of the snap-in grooves at the tensioning piston may be smaller than double the diameter of the snap-in grooves. The snap-in grooves are preferably in the form of circular segments.

According to yet another inventive embodiment, the locking bracket comprises another U-shaped section with an angled portion, said two U-shaped sections being arranged at opposite sides of the ring-shaped clamping area, and two guiding projections projecting from the wall of the housing are provided axially guiding the angled portions of the U-shaped sections in the working stroke of the tensioning piston and securing the locking bracket against torsion. Due to the opposing arrangement of the U-shaped sections each comprising an angled portion, there is not only good axial guidance and radial torsion-proof condition but also a uniform distribution of the axial loading. Avoiding unilateral loading simultaneously reduces the risk of local wear as well as the danger of tensioning piston jamming.

According to a special development, stoppers are provided at the rear ends of the guiding projections for limiting the axial movement of the locking bracket in the advancing movement by abutment of the bridges of the U-shaped sections thereto. Owing to the design of (front) stoppers provided at the rear ends of said guiding projections, it can be done without additional stoppers for limiting the advancing movement. Doing without front stoppers beyond the lower stop face at the housing in the tensioning direction of the tensioning piston may particularly result in an especially simple design of the housing without any other housing elements at the tensioning side.

In a simple embodiment the locking bracket comprises, at the side opposite to the U-shaped section of the ring-shaped section, an open section including two radially outwardly projecting end legs, to allow for a simple widening of the ring-shaped section of the locking bracket during the adjustment of the working stroke of the tensioning piston. According to an embodiment of the locking bracket with two U-shaped sections, one of said U-shaped sections is provided with an opening or with two overlapping ends, preferably in the bridging area of the U-shaped section, thus enabling, in this embodiment, that the two clamping sections of the ring-shaped clamping area is widened by the bend and the torsion in the spring section.

The lower stopper of the adjustment means for limiting the retraction movement of the tensioning piston into the piston bore of the housing is preferably formed by the tension-side face of the housing, the inner face being chamfered to provide for a solid clamping of the ring-shaped area or of the clamping sections of the locking bracket on the locking profile of the tensioning piston, in order to accommodate at least partially the arch-shaped clamping sections of the circular clamping area or the clamping area adapted to the form of the tensioning piston cross-section.

BRIEF DESCRIPTION OF THE DRAWINGS

Embodiments of the present invention will now be explained in detail by means of the Figures, in which:

FIG. 2b is a sectional view with a longitudinal section of the tensioning apparatus of FIG. 1 being offset by 90° with regard to FIG. 2a;

DETAILED DESCRIPTION

Figure 1:
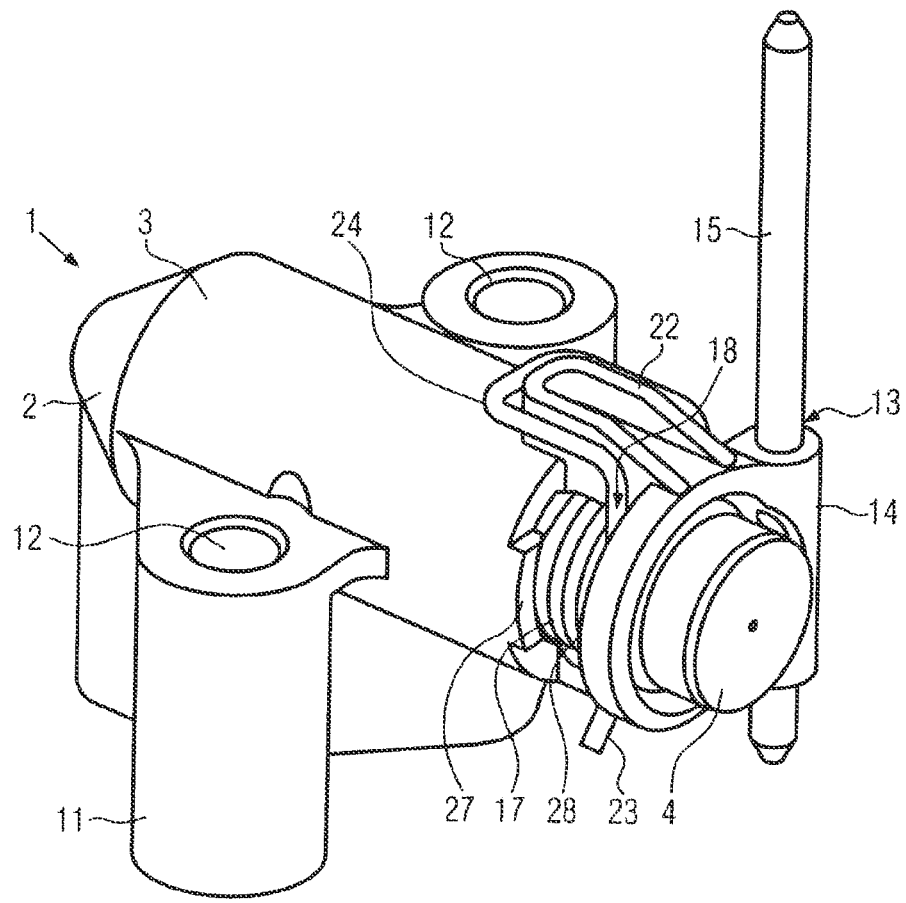
FIG. 1 is a perspective view of an inventive tensioning apparatus comprising an adjusting means.

With regard to FIGS. 1 to 3, the first embodiment of an inventive tensioning apparatus 1 for a flexible drive means will now be explained in more detail. The tensioning apparatus 1 comprises a housing 2 with a hollow-cylindrical body 3 into which an also hollow-cylindrical tensioning piston 4 is longitudinally guided. The hollow-cylindrical body 3 and the tensioning piston 4 jointly form a pressure chamber 5 connected to a hydraulic pipe 7 via a non-return valve 6. The upper part of the hollow-cylindrical tensioning piston 4 includes a packing 8 for limiting the volume of pressure chamber 5. The tensioning piston 4 is axially preloaded by means of a spiral pressure spring 9 and urges towards the axis of tensioning piston 4 against a flexible drive means (not shown), particularly a drive chain of the internal combustion engine. To provide ventilation of the pressure chamber 5 and a leakage flow of the hydraulic medium, the face of the tensioning piston 4 is provided with a vent hole 10. The pressure spring 9 urges the mushroom-shaped head of the packing 8 that is usually made of plastic onto the mouth of the vent hole 10 provided in the pressure chamber 5 in the face of the hollow-cylindrical tensioning piston 4 so that the hydraulic medium can escape from the pressure chamber 5 via vent hole 10 in doses only.

Housing 2 of the inventive tensioning apparatus 1 has been designed as flange housing, comprising lateral mounting flanges 11 and bolt holes 12 for mounting the tensioning apparatus 1 at an engine block. Moreover, housing 2 can also be designed as threaded housing with the cylindrical house body 3 being provided with an external thread.

The front end of housing 2 in the tensioning direction is further provided with a transport securing means 13 consisting of a locking sleeve 14 that is part of the housing 2 and a removable safety bolt 15 cooperating with a locking projection 16 provided at the tensioning piston 4 in order to fasten the tensioning piston 4 in the transport position thus keeping the tensioning piston 4 fixed in an entirely retracted position in the housing 2. Safety bolt 15 guided and held in locking sleeve 14 is arranged above locking projection 16 with regard to tensioning piston 4 so that safety bolt 15 overlaps with locking projection 16 to prevent tensioning piston 4 moving forward out of housing body 3.

The tensioning piston 4 includes multiple annular grooves 17 of a segmental cross-section one over the other at the front end of the tensioning piston 4 in the tensioning direction provided as locking profile of the adjusting means, directly starting beneath the locking projection 16. A locking bracket 18 engages with said snap-in grooves 17 at tensioning piston 4, the arch-shaped clamping sections 19 of the clamping area of the locking bracket 18 with its two circular segmental legs being positioned in the annular grooves 17 at the tensioning piston 4 and holding the tensioning piston 4 by means of the preloading force of locking bracket 18. Adjacent to the arch-shaped sections 19 of the clamping area locking bracket 18 comprises a U-shaped section 20 that, first of all starting from the arch-shaped sections 19 positioned in the annular grooves 17 of tensioning piston 4, radially extends outwards and opens into an angled portion 21, the two legs thereof primarily extending parallel to the wall of the housing of the hollow-cylindrical body 3 and being axially guided by a guide projection 22 projecting from the wall of the housing of body 3. The parallel legs of the U-shaped section in the angled portion 21 extending in extension of the segmental legs of the ring-shaped clamping area 19 are each arranged at one side of the guide projection 22, respectively, so that the angled portion 21 of said U-shaped section 20 encircles guide projection 22 at three sides thereof. End legs 22 are provided at both segmental legs, respectively, at the sides of the arch-shaped sections 19 opposite to the U-shaped section 20, each projecting radially outwards and not overlapping each other and providing an opening of locking bracket 18 with regard to the annular clamping area. In this embodiment, guide projection 23 is a U-shaped bridge chamfered at its front, open end while forming a stopper 24 for locking bracket 18 at the end opposite to the tensioning direction.

Figure 2A:
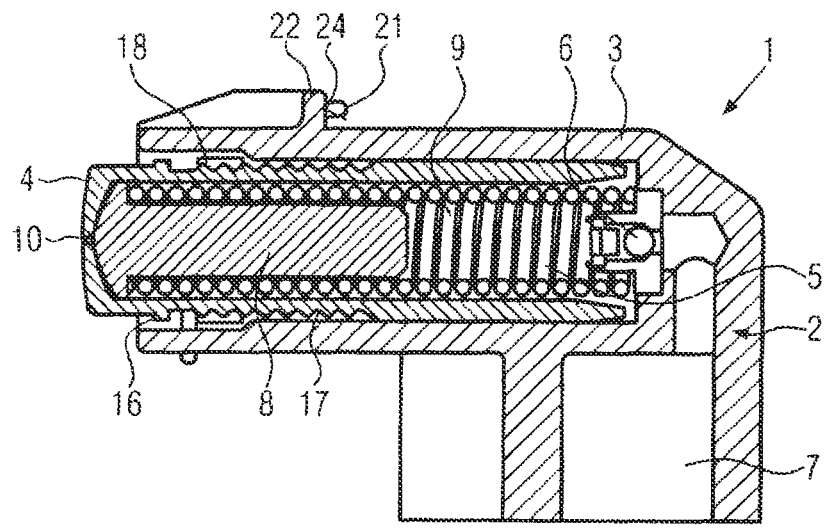
FIG. 2a is a sectional view with a longitudinal section of the tensioning apparatus of FIG. 1.
Figure 2B:
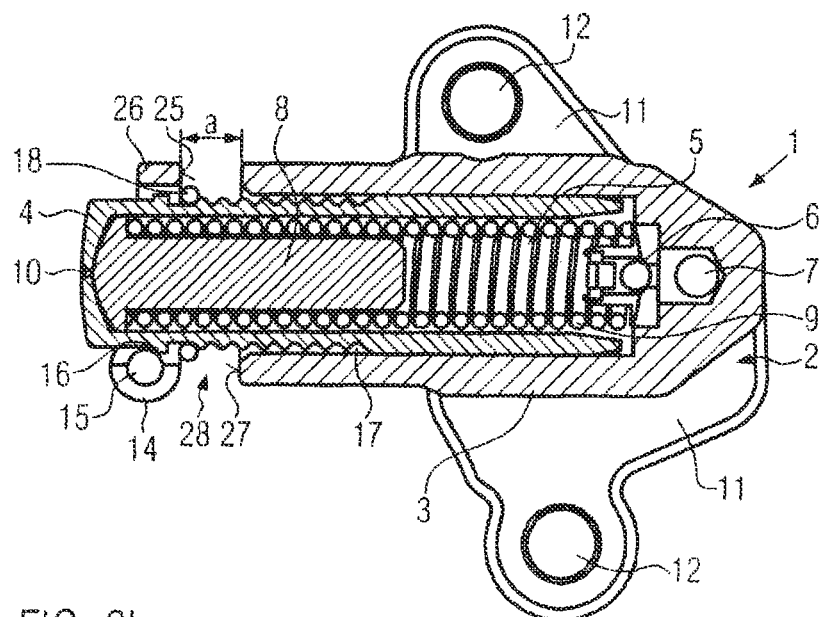
Figure 3:
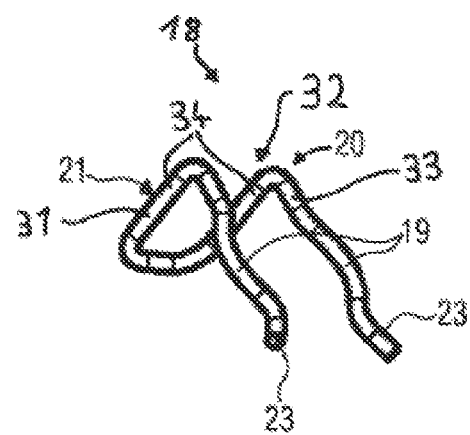
FIG. 3 is a perspective view of the locking bracket of the tensioning apparatus of FIG. 1.
Figure 4:
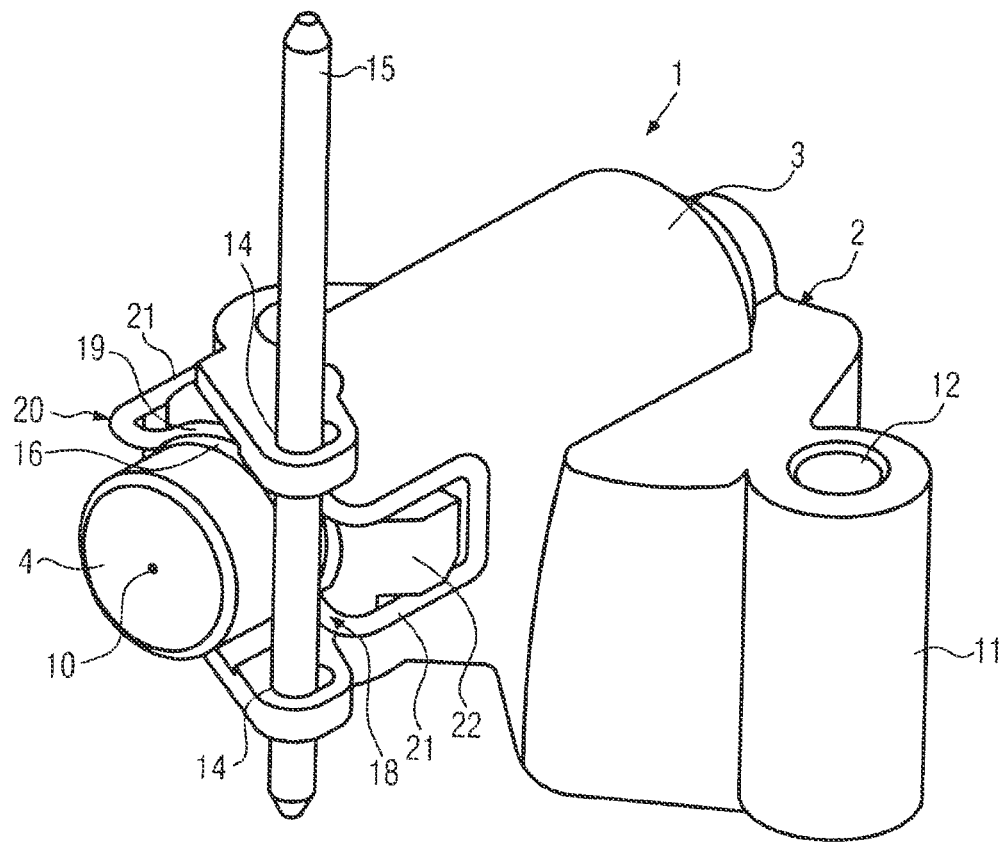
FIG. 4 is a perspective view of another embodiment of an inventive tensioning apparatus with adjusting means.

FIGS. 1 and 2 illustrate the inventive tensioning apparatus 1 in a transport locking position. This position locks the advancing movement of the tensioning piston 4 via safety bolt 15, as safety bolt 15 in locking sleeve 14 overlaps with locking projection 16 at tensioning piston 4. The transport locking 13 is deactivated by removal of safety bolt 15, thus bringing the tensioning apparatus 1 in an operating position by the advancement of tensioning piston 4 from housing body 3 until it reaches a tensioning position.

When in operating position, tensioning piston 4 can freely move out of said hollow-cylindrical housing body 3 until locking bracket 18 abuts against a front stopper face 25 formed by a front-end ring 26 of the housing. Said front-end ring 26 is connected to the rest of housing body 3 via two bridges, the guide projection 22 partially being formed on one of said bridges. Housing windows 28 are provided between the front-end ring 26 and the bridges as well as the rear stopper 27 formed by the housing body 3, the arch-shaped sections 19, the radial portion of the U-shaped section 20 and the end legs 23 of locking bracket 18 moving freely therein the dynamic operating range of tensioning apparatus 1. Thus, housing windows 28 define the damped, free working stroke a of tensioning piston 4. Tensioning piston 4 moves in such free working stroke a until locking bracket 18 abuts against the front stopper 25 during an advancing movement of tensioning piston 4, or until the angled part 21 of the U-shaped section 20 of locking bracket 18 abuts against stopper 24 of guide projection 22. During a continuous advancing movement of tensioning piston 4, induced by the wear of driving components or the elongation of the drive means, the arch-shaped clamping sections 19 of locking bracket 18 are spread apart or widened by the ascending flanges of the segmental annular grooves 17 on tensioning piston 4 against the spring portion 32 preload so that tensioning piston 4 can slide through locking bracket 18 and locking bracket 18 can engage again with the next annular groove 17. Thus, the resilient spring portion 32 of locking bracket 18 defined by U-shaped section 20 allows for the reversible radial movement of the arch-shaped clamping sections 19. An essential part of the bending between the arch-shaped clamping sections 19 is provided by the torsion bars 31 of the parallel legs 34 of the angled part 21 of U-shaped section 20. Consequently, the proper bending portion 33 in the bending range of the U-shaped section 20 is minimized and a plastic deformation prevented.

If there is a heavy retraction movement of tensioning piston 4 into hollow-cylindrical housing body 3, for example in case of insufficient hydraulic pressure in the pressure chamber 5, locking bracket 18 abuts against the rear stopper 27 provided at the tension-side end of the interrupted housing body 3. The rear stopper 27 includes an internal chamfer 29 into which the annular section 19 of locking bracket 18 inserts so that in case of further tensioning piston retraction movement into hollow-cylindrical body 3 the segmental legs of the annular clamping area are urged into the annular groove 17 of tensioning piston 4 and further retraction of tensioning piston 4 into housing 2 is safely blocked.

Locking bracket 18 and tensioning piston 4 commonly fastened via said arch-shaped clamping areas 19 of locking bracket 18 are axially guided at guide projection 22 in torsion-safe manner in the dynamic operating range of tensioning apparatus 1 defined by the free working stroke a through the guidance of angled part 21 of the U-shaped section 20 of locking bracket 18. Avoiding erratic retraction movement of tensioning piston 4 by fastening the locking bracket 18 at the rear stopper 27 prevents punching of load peaks, e.g. during the start of an internal combustion engine. Skipping of the drive means on the drive wheels can thus also be safely avoided, especially when the pressure chamber 5 of the tensioning apparatus 1 has not yet been entirely filled up with hydraulic means.

In the following, two more embodiments of the present invention will be explained in more detail with regard to FIGS. 4 to 6 and 7 and 8. In this connection it is hereby just referred to the substantial differences with regard to the preceding embodiments. Same reference numbers are used for structurally and effectually identical components, and it is hereby referred to the above description or to the following description of the second embodiment.

The second embodiment of an inventive tensioning apparatus 1 illustrates a locking bracket 18 comprising two U-shaped sections 20 each having an angled portion 21 and being arranged at opposite sides of the arch-shaped clamping sections 19. Again, angled portions 21 primarily extend parallel to the housing wall of housing body 3, i.e. parallel to the axis of tensioning piston 4. Two guide projections 22 project from the hollow-cylindrical body 3 for axially guiding said angled portions 21 of said two U-shaped sections 20 in the working stroke a of tensioning piston 4 and for securing locking bracket 18 as well as tensioning piston 4 fastened via the annular clamping area of locking bracket 18 against torsion. In this embodiment, safety bolt 15 of transport securing means 13 is held by two locking sleeves 14 positioned beside of tensioning piston 4 and cooperates in the same way with safety projection 16 provided at the tensioning piston 4 in order to hold the tensioning piston 4 in an entirely retracted position in said housing 2.

Figure 5:
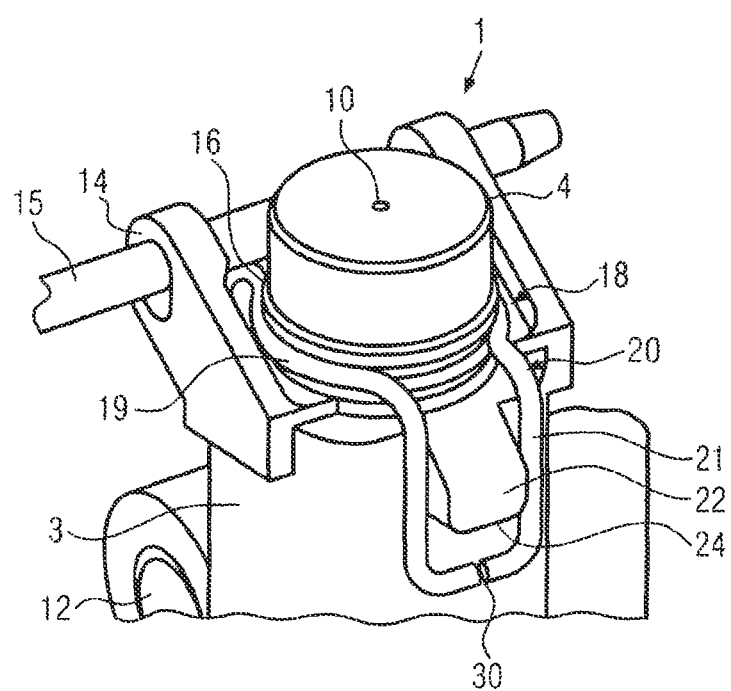
FIG. 5 is a perspective plan view of a part of the tensioning apparatus of FIG. 4.

As can be seen very well in the plan view according to FIG. 5, a U-shaped leg 20 of locking bracket 18 is provided with a gap 30 at the lower end of angled portion 21, to allow for a widening of the annular clamping area or the arch-shaped sections 19 of locking bracket 18 while tensioning piston 4 is continuously moving forward.

Figure 6A:
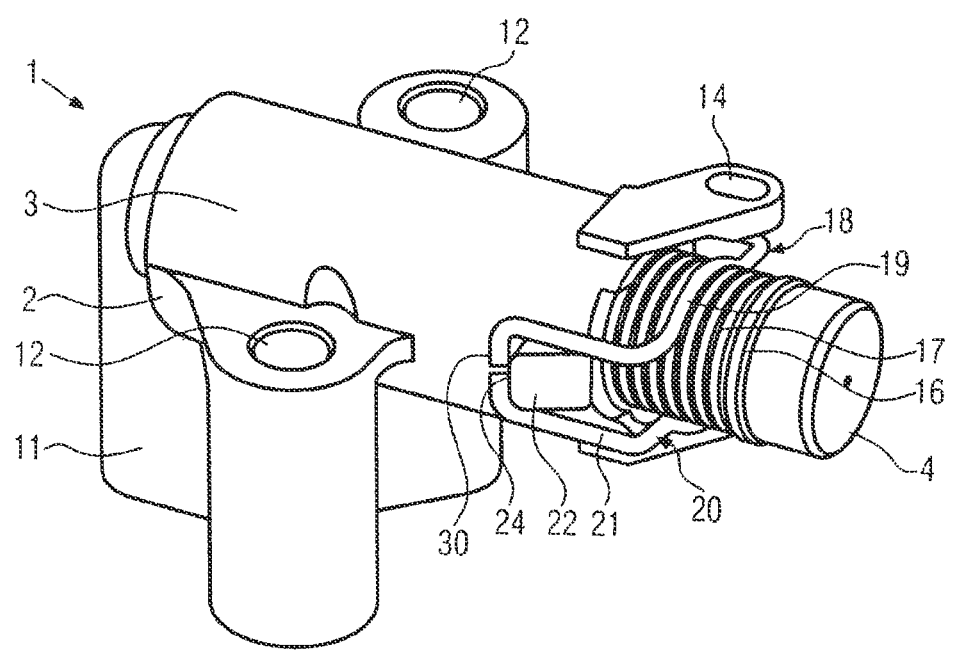
FIG. 6a is a perspective view of the tensioning apparatus of FIG. 4 with the adjusting means being in an advanced condition.

FIG. 6a illustrates the second embodiment of an inventive tensioning apparatus 1 in an operating condition, viz. in which the safety bolt 15 is removed from locking sleeve 14 and the tensioning piston 4 has moved forward into an operating position. In case of the advanced condition of tensioning piston 4 as shown here, the lower ends of the U-shaped sections 20 of locking bracket 18 abut in their angled portions 21 against stoppers 24 of the two guide projections 22. In case of a continuously advancing movement of tensioning piston 4, both arch-shaped sections 19 of locking bracket 18 are spread apart through the ascending flange of the segmental annular grooves 17 on tensioning piston 4, the gap 30 widening at the lower end of the one U-shaped section 20 of locking bracket 18 to allow the annular section 19 being spread apart without widening of gap 30 avoiding the close fitting of the locking bracket 18 at stopper 24 of guide projection 22. Widening or spreading the annular clamping area of locking bracket 18 through the resilient bending in the bending area and in the tension area of the spring portion enables the tensioning piston 4 to slide through locking bracket 18 into the next following annular groove 17 and, thus, to adjust the operating range of tensioning apparatus 1 in order to use the entire free working stroke a of tensioning piston 4 for the tensioning and damping function of tensioning apparatus 1. In this connection, the free working stroke a is defined, in the second embodiment, by the movement of locking bracket 18 between stoppers 24 at the guide projections 22 and the rear stopper 27 at the front end of the hollow-cylindrical housing body 3.

Figure 6B:
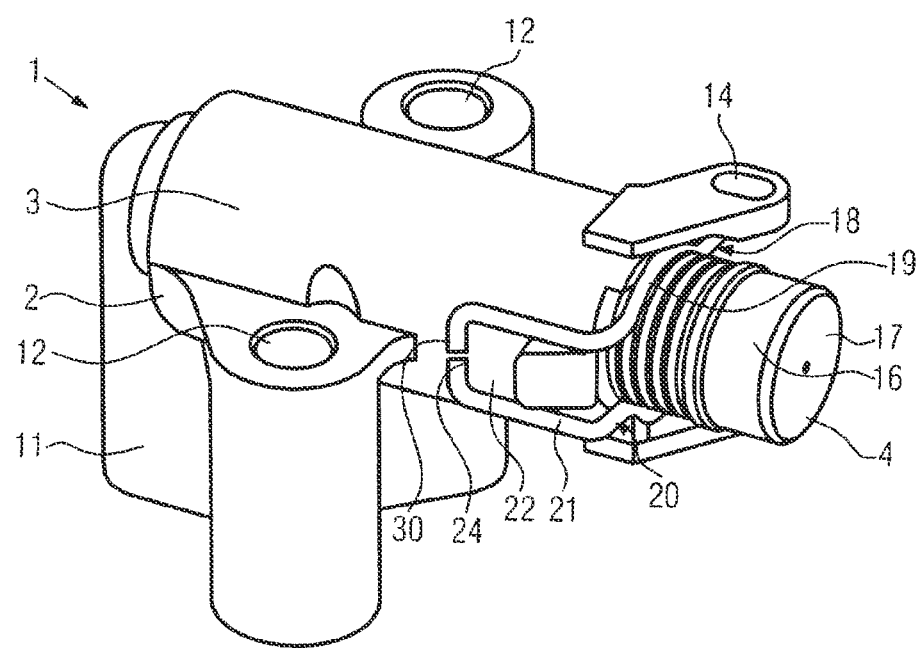
FIG. 6b is a perspective view of the tensioning apparatus of FIG. 4 with the adjusting means being in a retracted condition.
Figure 7:
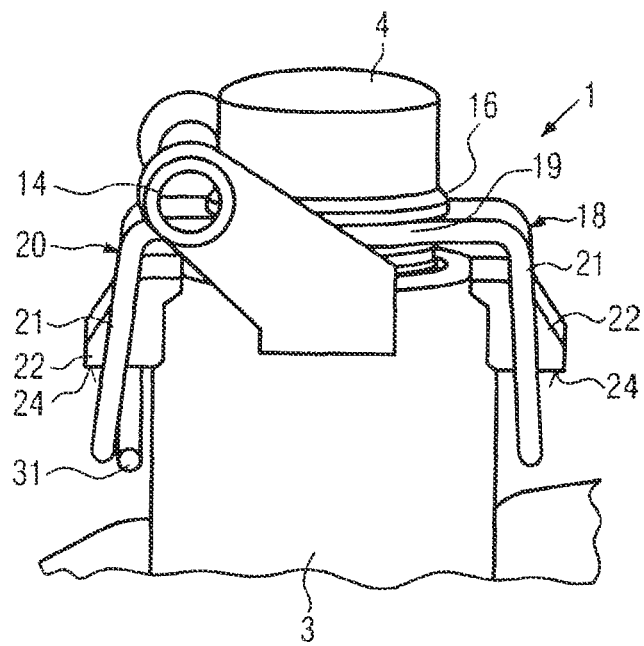
FIG. 7 is a side view of a third embodiment of an inventive tensioning apparatus with adjusting means.
Figure 8:
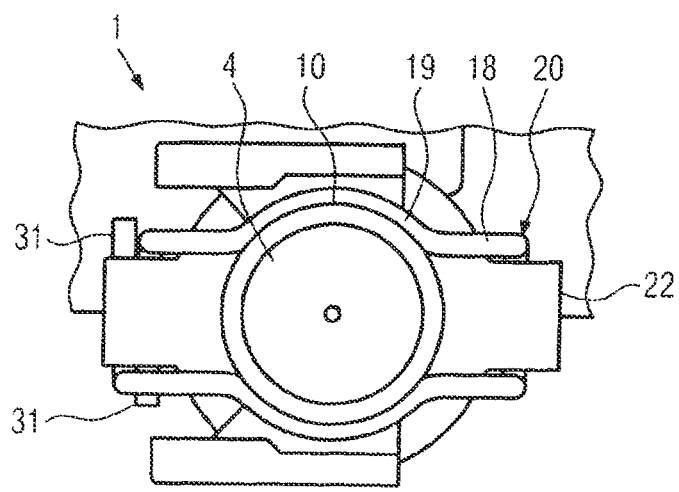
FIG. 8 is a plan view of the tensioning apparatus of FIG. 7.

In contrast thereto, FIG. 6b illustrates tensioning piston 4 of the second embodiment of an inventive tensioning apparatus 1 in an entirely retracted condition in which the arch-shaped sections 19 of locking bracket 18 lie close to the rear stopper 27 of the tension-side end of hollow-cylindrical housing body 3. Here also is the rear stopper 27 again provided with an internal chamfer 29 into which clamping sections 19 of circular cross-section engage so that in case of further retraction of said tensioning piston 4 into said hollow-cylindrical housing body 3 said segmental legs of said arch-shaped clamping sections 19 are urged into the corresponding annular groove 17 of tensioning piston 4 and safely prevent any further movement of tensioning piston 4 into housing 2.

The third embodiment of the inventive tensioning apparatus 1 again illustrates a locking bracket 18 comprising two U-shaped sections 20 each having an angled portion 21 and being arranged at the opposite sides of the annular clamping area of locking bracket 18. Here, the angled portions 21 extend slightly inclined to the housing wall of housing body 3, i.e. at a different distance to housing body 3. The angle between the portion of U-shaped section 20 extending radially outwards and the angled portion 21 thereof is about 80° to 90°. As the lower ends of the U-shaped sections 20 of locking bracket 18 have, due to the minor inclination of the angled portions 21, a larger distance to the housing wall of housing body 3, said guide projections 22 project further away from said housing wall to form a sufficient stopper 24.

For widening or spreading apart the arch-shaped clamping sections 19 of locking bracket 18 at the stopper of the lower ends of said U-shaped sections 20 at stoppers 24, one of said U-shaped legs 20 of locking bracket 18 is provided with two overlapping free ends 31 at its lower end of the angled portion 21 so as to allow for widening said annular clamping area of locking bracket 18 during a continuous advancing movement of tension piston 4 by means of a relative movement. Owing to the overlapping of the free ends 31, the individual legs of the appertaining angled portion 21 incline differently, as the free ends 31 simultaneously abut against stopper 24 of guide projection 22 to provide safe abutment of locking bracket 18 and a uniform widening of the arch-shaped clamping sections 19 of locking bracket 18.

The invention claimed is:

1. A tensioning apparatus for a flexible drive means, particularly a drive chain of an internal combustion engine, comprising:
   a housing, a tensioning piston movably guided within said housing, and an adjusting means for gradually adjusting a working stroke of said tensioning piston,
   said adjusting means including a locking bracket and an appertaining locking profile at the tensioning piston,
   said locking bracket having two clamping sections for engagement with said locking profile at said tensioning piston and a spring portion for combining said clamping sections, wherein said spring portion combines said clamping sections in a spring-resilient manner such that the clamping sections move laterally apart in a clamping plane,
   wherein said spring portion includes at least two bending portions and at least one torsional area in the form of a torsion bar for combining said clamping sections in the spring-resilient manner, said two bending portions radially extending outwards to the clamping sections in the clamping plane and performing a spiral spring pitch while the axis of said torsion bar being arranged at an angle to the clamping plane and performing a torsion spring pitch while the clamping sections are laterally moving apart in the clamping plane.

2. The tensioning apparatus of claim 1, wherein the torsion spring pitch has a stronger effect on the spring-resilient movement of the clamping sections than the spiral spring pitch while said clamping sections are laterally moving apart in a plane.

3. The tensioning apparatus of claim 1, wherein the axis of the torsion bar is arranged at an angle between 45° and 90° to the clamping plane of said clamping sections.

4. The tensioning apparatus of claim 1, wherein the axis of the torsion bar is arranged at an angle between 75° and 90° to the clamping plane of said clamping sections.

5. The tensioning apparatus of claim 1, wherein the spring portion comprises at least two torsional areas.

6. The tensioning apparatus of claim 1, wherein the spring portion is a U-shaped section of said locking bracket partially extending radially outwards and including an angled portion.

7. The tensioning apparatus of claim 6, wherein said housing comprises a guide projection projecting from the housing and axially guiding said angled portion of said U-shaped section of said locking bracket in the working stroke of said tensioning piston in torsion-proof manner.

8. The tensioning apparatus of claim 7, wherein said angled portion has two parallel legs and said guide projection is arranged at least partially between the two parallel legs.

9. The tensioning apparatus of claim 7, wherein said guide projection forms a stopper at its rear end for limiting an axial movement of said locking bracket in an advancing direction.

10. The tensioning apparatus of claim 6, wherein said clamping sections of said locking bracket are formed as two opposing arch-shaped sections each being arranged in extension of said parallel legs of said U-shaped portion.

11. The tensioning apparatus of claim 1, wherein the locking profile of said tensioning piston has the form of a groove profile with multiple snap-in grooves.

12. The tensioning apparatus of claim 11, wherein the multiple snap-in grooves are circumferential snap-in grooves.

13. The tensioning apparatus of claim 6, wherein said locking bracket comprises another U-shaped section with an angled portion, said U-shaped sections being arranged at opposite sides of said clamping sections and two guide projections being provided projecting from the housing for axially guiding said angled portions of said U-shaped sections in the working stroke of said tensioning piston and keeping the locking bracket in torsion-proof manner.

14. The tensioning apparatus of claim 13, wherein said guide projections form stoppers at their rear ends for limiting an axial movement of said locking bracket in an advancing direction.

* * * * *